(12) United States Patent
Rausch et al.

(10) Patent No.: US 7,836,855 B2
(45) Date of Patent: Nov. 23, 2010

(54) SORTER TRAINER GATE ASSEMBLY

(75) Inventors: Andy Rausch, Rochester, IN (US);
Harry R Van Horn, II, Monterey, IN (US)

(73) Assignee: CTB, Inc., Milford, IN (US)

( * ) Notice: Subject to any disclaimer, the term of this patent is extended or adjusted under 35 U.S.C. 154(b) by 903 days.

(21) Appl. No.: 11/714,287

(22) Filed: Mar. 5, 2007

(65) Prior Publication Data
US 2007/0204807 A1 Sep. 6, 2007

Related U.S. Application Data

(60) Provisional application No. 60/780,017, filed on Mar. 6, 2006.

(51) Int. Cl.
*A01K 1/10* (2006.01)
(52) U.S. Cl. ........................ 119/842; 119/840
(58) Field of Classification Search ................. 119/842, 119/515, 521, 840, 14.18
See application file for complete search history.

(56) References Cited

U.S. PATENT DOCUMENTS

| 1,381,797 | A | | 6/1921 | Caspers |
| 4,138,968 | A | * | 2/1979 | Ostermann ................... 119/842 |
| 6,220,205 | B1 | | 4/2001 | Massie |
| 6,239,711 | B1 | | 5/2001 | Downey et al. |
| 6,539,896 | B1 | | 4/2003 | Larsen et al. |
| 6,622,651 | B1 | * | 9/2003 | Dessing ................... 119/14.08 |
| 7,444,961 | B1 | * | 11/2008 | Ellis .......................... 119/842 |
| 7,607,405 | B2 | * | 10/2009 | Pratt ....................... 119/51.02 |
| 2003/0192487 | A1 | | 10/2003 | Zimmerman |

* cited by examiner

*Primary Examiner*—Yvonne R. Abbott
(74) *Attorney, Agent, or Firm*—Harness, Dickey (57) ABSTRACT

An apparatus and method for sorting animals includes a housing having a basket area and a measuring device. An entry gate is mounted to the housing and is moveable between open and closed positions. A sort gate is mounted to the housing and moveable between a first and a second position based on a measurement taken by the measuring device. A trainer gate is mounted to the housing and moveable through an operating position whereby the trainer gate contacts an animal in the basket area and urges the animal toward the sort gate. A programmable controller communicates with the measuring device, the entry gate, the sort gate and the trainer gate and controls actuation of the entry gate, the sort gate and the trainer gate.

20 Claims, 8 Drawing Sheets

SORTER TRAINER GATE ASSEMBLY

CROSS-REFERENCE TO RELATED APPLICATIONS

This application claims the benefit of U.S. Provisional Patent Application No. 60/780,017 filed Mar. 6, 2006, the disclosure of which is hereby incorporated by reference as if fully set forth herein.

FIELD

This invention relates generally to a method and apparatus for sorting animals, and more particularly, to a method and apparatus for sorting animals through a programmable gate having increased throughput.

BACKGROUND

It is common in the livestock industry to monitor the weight of animals and sort them based on a measured weight. Various sorting devices are available to facilitate such measuring and sorting. It has been found however, that many of these devices present drawbacks. For example, in some instances it has been observed that animals may tend to unexpectedly enter and/or stay in the device for extended periods, much to the discouragement of the farmer. In some examples, the animals may lie down in the device to sleep or otherwise avoid other animals. In other examples it has been shown that animals do not exit the machine subsequent to weighing.

SUMMARY

An apparatus for sorting animals includes a housing having a basket area and a measuring device. An entry gate is mounted to the housing and is moveable between open and closed positions. A sort gate is mounted to the housing and moveable between a first and a second position based on a measurement taken by the measuring device. A trainer gate is mounted to the housing and moveable through an operating position whereby the trainer gate contacts an animal in the basket area and urges the animal toward the sort gate. A programmable controller communicates with the measuring device, the entry gate, the sort gate and the trainer gate and controls actuation of the entry gate, the sort gate and the trainer gate.

A method for sorting aggressive animals includes providing a housing including a basket area having a measuring device, a controller, an entry gate and a trainer gate. Control opens the entry gate and determines whether an animal is on the measuring device. The entry gate is closed based on the animal on the measuring device. The animal is measured. Control determines if the animal measures within a threshold. The sort gate is opened in either a first direction or a second direction based on the measurement determination. The trainer gate is extended and contacts the animal thereby urging the animal through the sort gate.

Further areas of applicability of the present disclosure will become apparent from the detailed description provided hereinafter. It should be understood that the detailed description and various examples, while indicating various embodiments of the invention, are intended for purposes of illustration only and are not intended to limit the scope of the following claims.

BRIEF DESCRIPTION OF THE FIGURES

The skilled artisan will understand that the drawings, described below, are for illustration purposes only. The drawings are not intended to limit the scope of the present teachings in any way.

DETAILED DESCRIPTION OF VARIOUS EMBODIMENTS

Aspects of the present teachings may be further understood in light of the following examples, which should not be construed as limiting the scope of the present teachings in any way.

Figure 1:
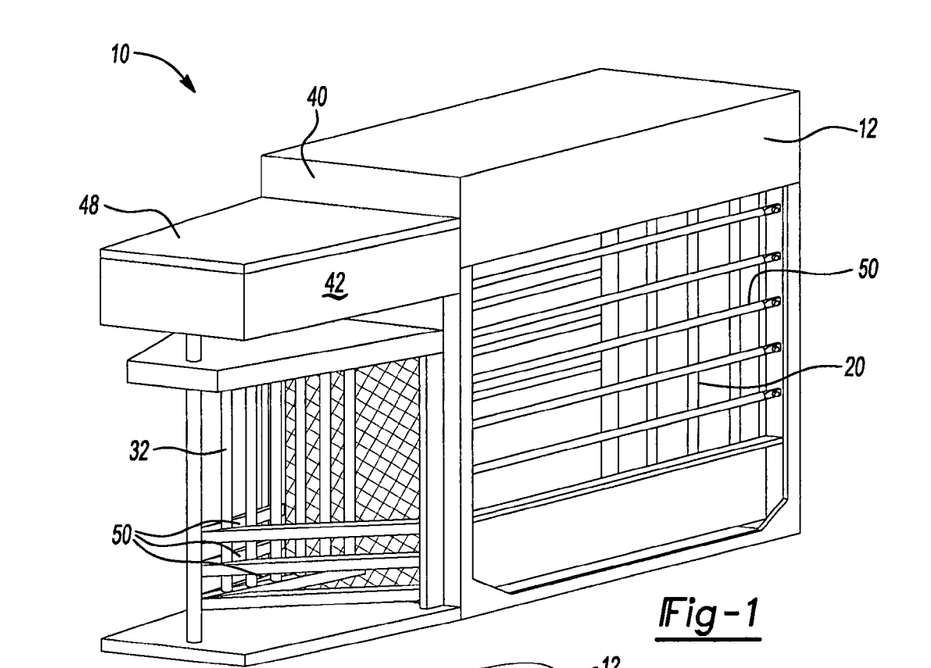
FIG. 1 is a front perspective view of a sorter trainer gate assembly according to the present teachings.
Figure 2:
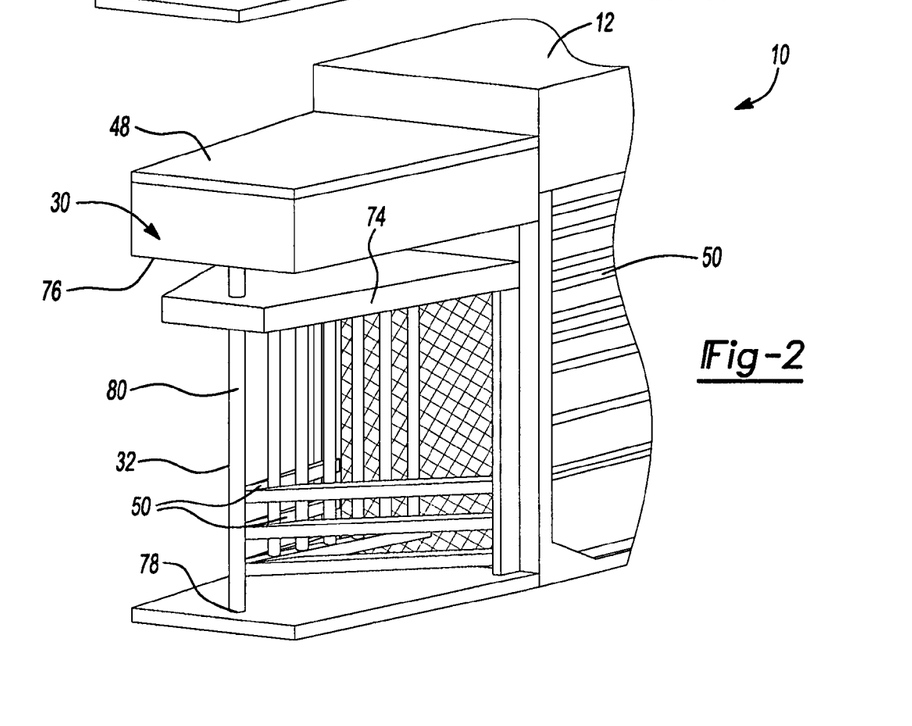
FIG. 2 is a detailed perspective view of a sort gate of the gate assembly of FIG. 1.

With initial reference to FIGS. 1-6 and 8, a sorter trainer gate assembly according to the present teachings is shown and identified generally at reference numeral 10. For simplicity the sorter trainer gate assembly 10 will hereinafter be referred to as the gate assembly 10. The gate assembly 10 generally includes a housing 12. The housing 12 includes an entry gate assembly 14 having a pair of entry gates 16, 18 (FIG. 3), a basket area 20 (FIG. 1), a trainer gate assembly 24 having a trainer gate 28 (FIG. 8) and a sort gate assembly 30 including a sort gate 32 (FIG. 2). A controller 36 (FIG. 6) communicates with a solenoid control unit 38 to control the position of the entry gates 16, 18, the trainer gate 28 and sort gate 32, respectively. As will be described in greater detail herein, the gate assembly 10 according to the present teachings provides a trainer gate assembly 24 mounted within the housing 12. When the trainer gate 28 is actuated through a set of instructions within the controller 36, the trainer gate 28 will urge an animal occupying the basket area 20 out of the gate assembly 10 after a measurement has been determined. Once the animal exits the gate assembly 10, the sort gate 32 will return to a position ready for the next animal.

The gate assembly 10 has been shown particularly useful for sorting hogs. It is contemplated however, that the gate assembly 10 may also be useful for sorting other animals such as those requiring regular weight monitoring. The gate assembly 10 may be constructed from durable rigid materials suitable for a livestock environment, such as stainless steel for example. Other materials may be used.

With specific reference now to FIGS. 1-3, the gate assembly 10 will be described in greater detail. The housing 12 generally includes an upper central portion 40, an upper front portion 42 and a scale portion 44 (FIG. 3) having a scale 46. The upper front portion 42 includes a removable cover 48. Containment bars 50 are provided on the entry gates 16, 18, the basket area 20 and the sort gate 32, respectively. The entry gates 16, 18 generally include frame portions 52 pivotally mounted to the housing 12 at pivot joints 56. A pair of swing arms 60 extend through passages 62 defined in the housing 12 and operably couple the entry gates 16, 18 with a first pneumatic cylinder 66 mounted in the upper central portion 40 (see e.g., FIG. 5 and schematic representation in FIG. 6). It is appreciated that the entry gates 16, 18 may be configured differently. In one example, the entry gate may comprise a single gate.

Figure 3:
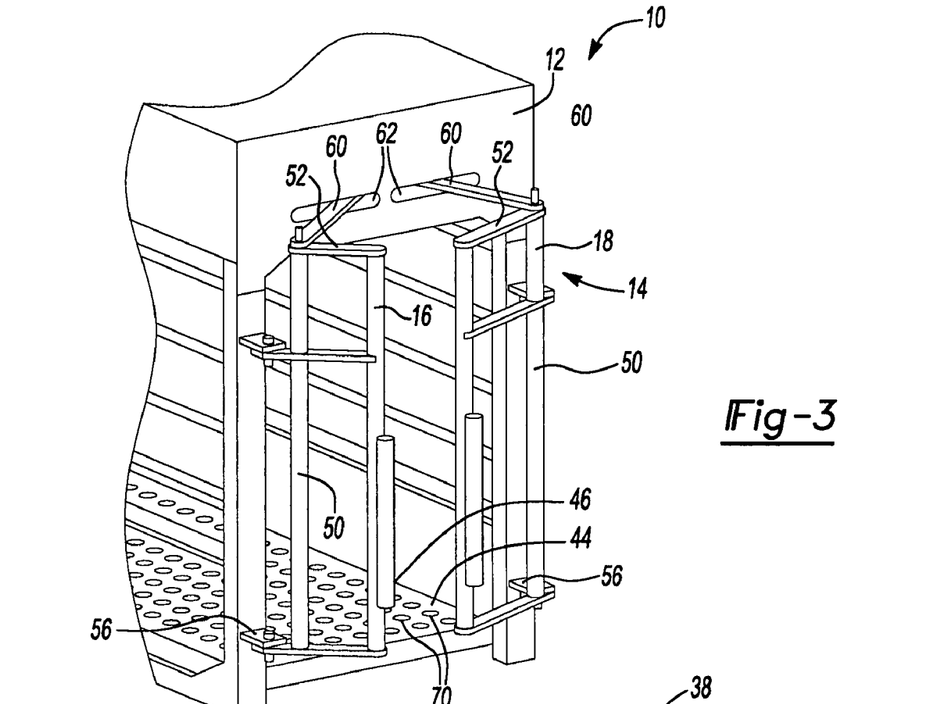
FIG. 3 is a rear perspective view of an entry gate of the gate assembly of FIG. 1.

With specific reference to FIG. 3, the scale 46 is arranged on a floor of the basket area 20. The scale 46 can have a plurality of protrusions 70. The protrusions 70 may provide increased grip for the animal and also discourage an animal from lying down in the basket area 20. The scale 46 communicates a weight measurement to the controller 36 (shown schematically in FIG. 6).

Figure 4:
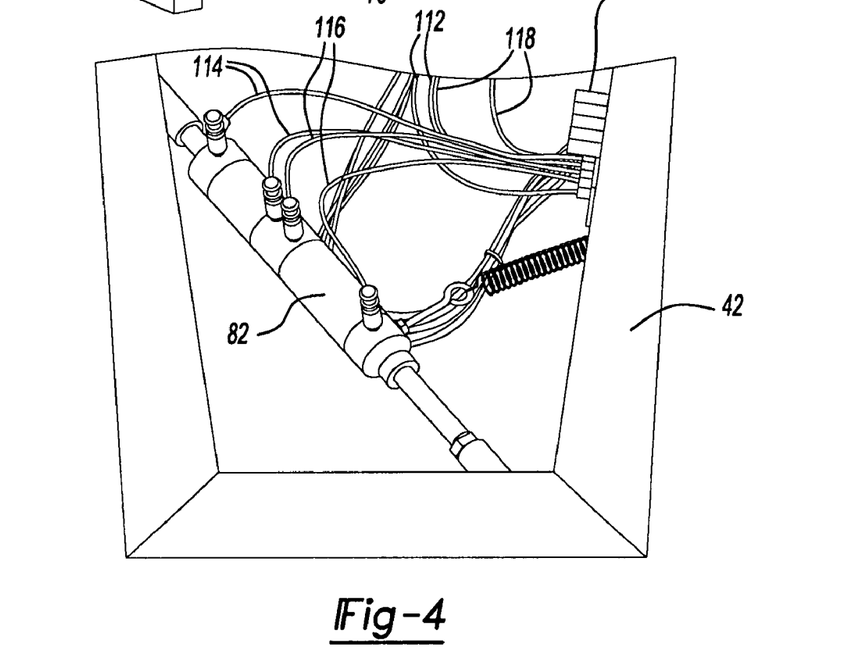
FIG. 4 is a top perspective view of a pneumatic cylinder operable to actuate the sort gate of FIG. 2.
Figure 5:
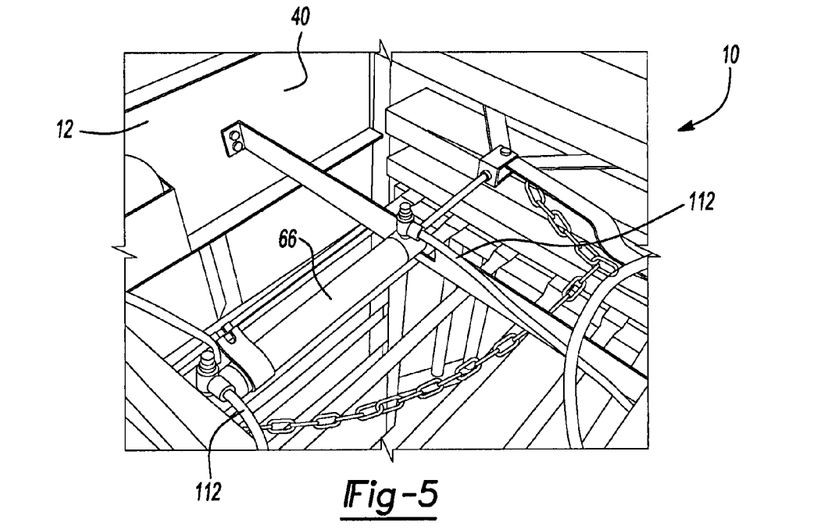
FIG. 5 is a top perspective view of a pneumatic cylinder operable to actuate the entry gate of FIG. 3.
Figure 13:
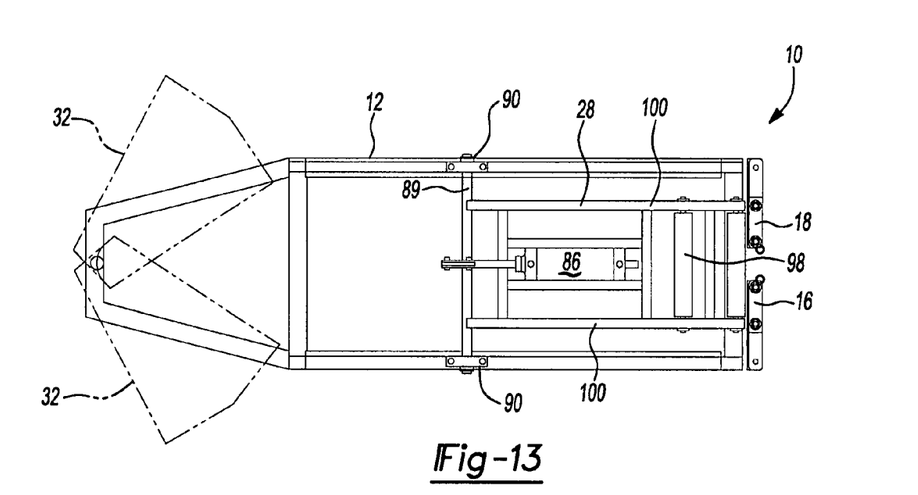
FIG. 13 is a top view of the gate assembly of FIG. 11 illustrating the entry gate in the closed position, the sort gate actuated to a first position (solid line) and a second position (phantom line) and the trainer gate in the retracted position.
Figure 14:
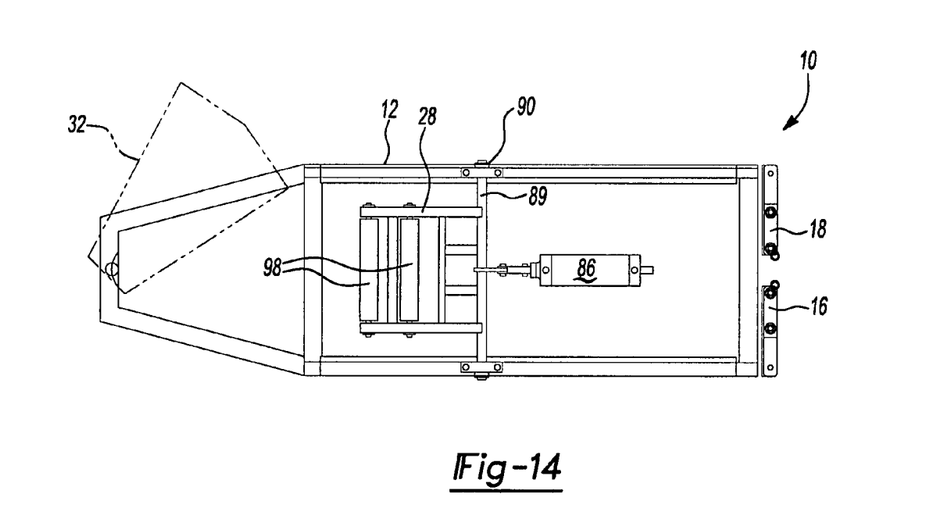
FIG. 14 is a top view of the gate assembly of FIG. 11 illustrating the entry gate in the closed position, the sort gate actuated to the first position and the trainer gate in an actuated position.

With reference now to FIG. 2, the sort gate 32 will be described in greater detail. The sort gate 32 can be generally triangular in shape and includes a frame 74 pivotally mounted at upper and lower pivot joints 76 and 78, respectively. A pivot axis 80 is defined through the pivot points 76 and 78. The sort gate 32 can swing about the pivot axis 80 to a first position (solid line, FIG. 13) or a second position (phantom line, FIG. 13) based on the weight measurement taken at the scale 46. FIG. 4 illustrates the upper front portion 42 with the cover 48 removed. As shown in FIG. 4, a second pneumatic cylinder 82 may be housed within the upper front portion 42. The second pneumatic cylinder 82 is operably connected to the sort gate 32 to impart rotational motion on the sort gate 32 about the pivot axis 80. The second pneumatic cylinder 82 may alternatively be mounted elsewhere within the housing 12.

As explained, the sort gate 32 can direct an animal in a first direction or a second direction based on a measured characteristic. In this particular example, the measured characteristic is the animal's weight taken by the scale 46. However, it is contemplated that other or additional characteristics may be measured by the gate assembly 10. In one example, the controller 36 may be programmed to direct animals meeting a predetermined weight threshold in a first direction such as into a holding pen (not shown) ready for market and animals not meeting the weight threshold into another holding pen (not shown) for additional feeding. In another example, the animals may be sorted according to an animal's behavior. It has been shown in some cases that an animal's weight is proportional to its behavior. Some behavioral characteristics associated with weight include an animal's aggressiveness, performance of the strain of animal, and other characteristics.

The gate assembly 10 may be configured to direct animals meeting a predetermined weight threshold (aggressive animals) into a first feeding pen, while directing animals under the weight threshold (less aggressive animals) into a second feeding pen. In this way, the more aggressive animals may be grouped separately from the less aggressive animals. As a result, a more consistent rationing of food may be obtained throughout all animals.

Turning now to FIGS. 8-14 the trainer gate assembly 24 will be described in greater detail. The trainer gate 28 is operable to urge an animal from the basket area 20 and through the sort gate 32. The trainer gate assembly 24 generally includes the trainer gate 28, bracing 84, a third pneumatic cylinder 86, an axle linkage 88 having an axle 89 rotatably mounted about a pair of bearings 90, and a cylinder mount 92. The bracing 84 provides a mounting structure between the trainer gate 28 and the sort gate 32.

Figure 8:
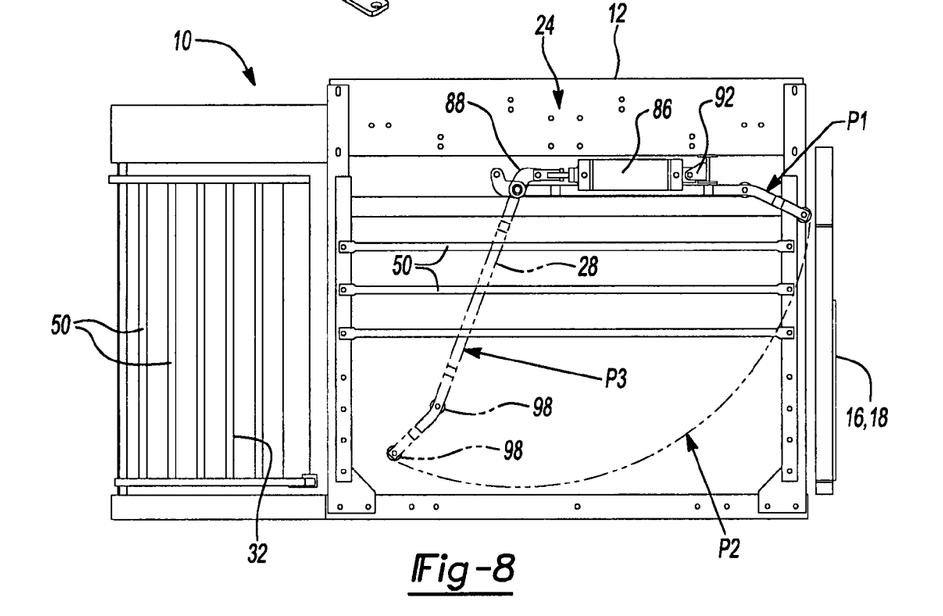
FIG. 8 is a side view of the gate assembly of FIG. 1 shown with portions of the frame removed to illustrate a trainer gate assembly.
Figure 9:
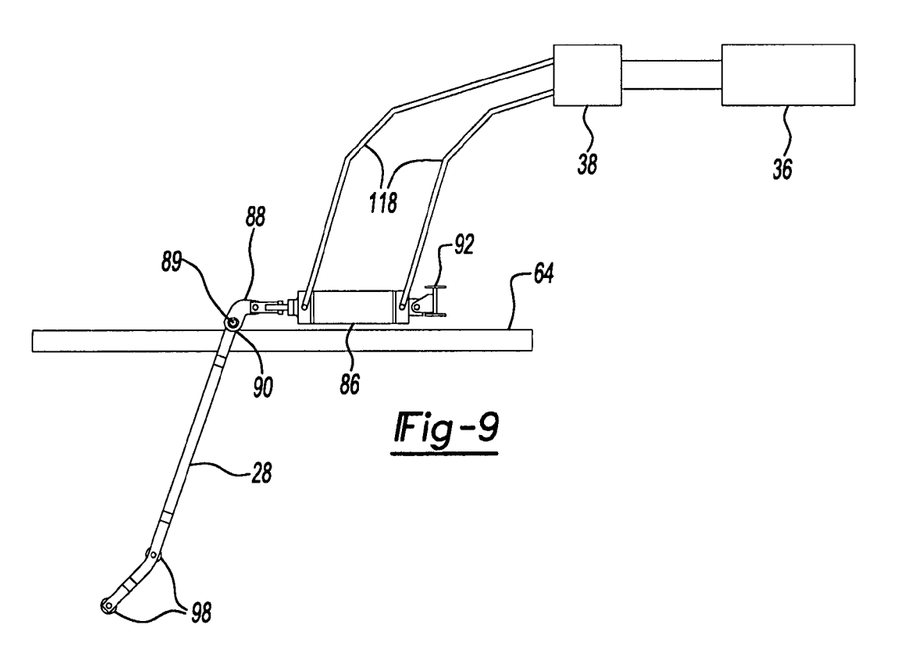
FIG. 9 is a schematic diagram of the trainer gate assembly of FIG. 8.
Figure 10:
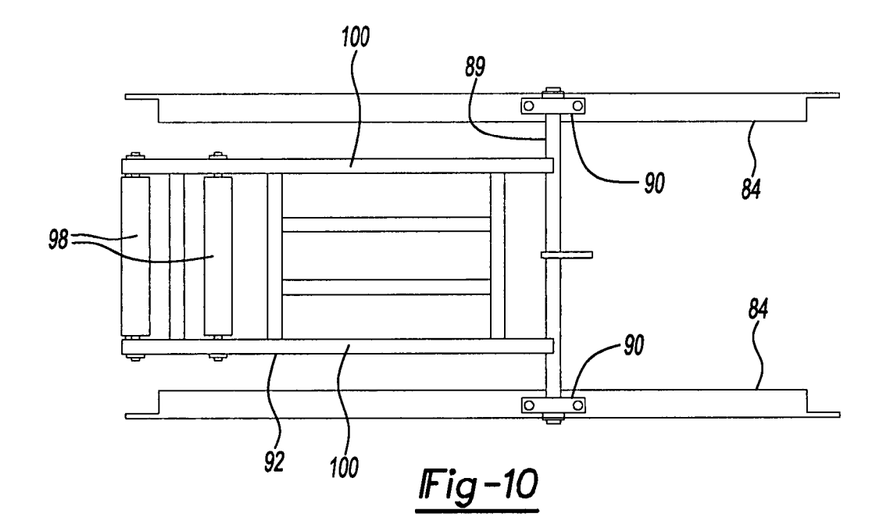
FIG. 10 is a top view of the trainer gate of FIGS. 8 and 9.
Figure 11:
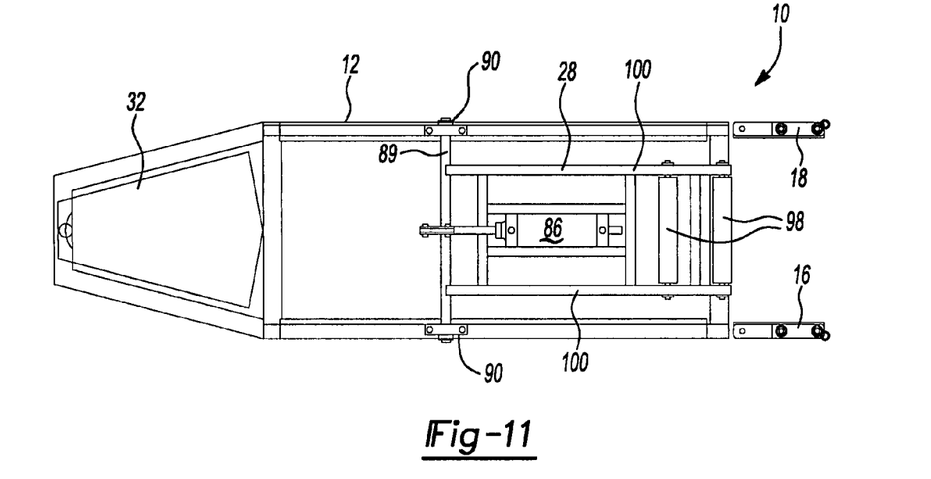
FIG. 11 is a top view of the gate assembly of FIG. 1 illustrating the entry gate in an open position, the sort gate in a closed position and the trainer gate in a retracted position.
Figure 12:
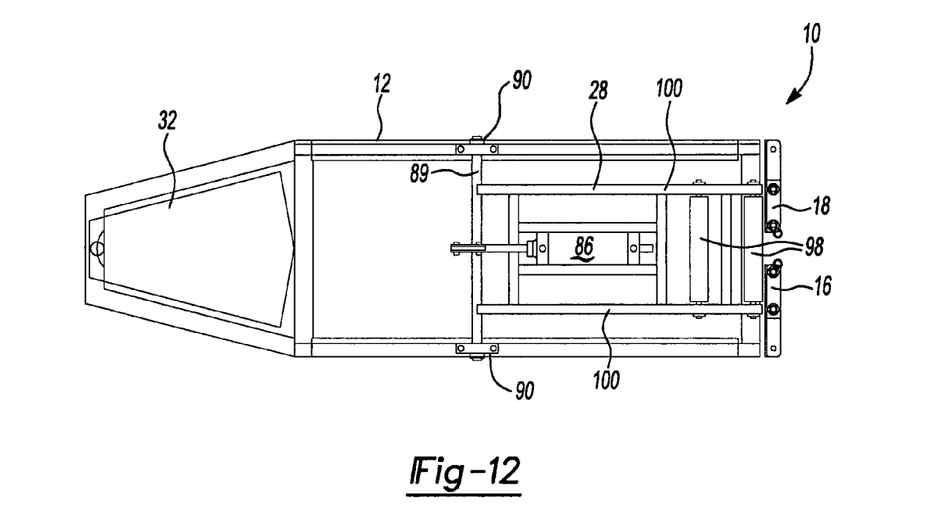
FIG. 12 is a top view of the gate assembly of FIG. 11 illustrating the entry gate in a closed position.

The trainer gate 28 generally includes a frame 92 and is mounted for pivotal movement about the axle 89. The third pneumatic cylinder 86 can actuate the trainer gate 28 from a first static position P1 (FIG. 8), through an operating position or path P2 to a second static position P3. When the third pneumatic cylinder 86 is in an extended position, the trainer gate 28 is in the first static position. When the third pneumatic cylinder 86 moves toward a retracted position, the trainer gate 28 rotates through the operating position P2. As depicted in FIG. 8, the operating position P2 can define a generally arcuate path through the basket area 20. In a fully retracted position, the trainer gate 28 is in the second static position P3. As best illustrated in FIG. 10, a pair of rollers 98 can be rotatably mounted between lateral ends 100 of the trainer gate frame 92. When the trainer gate 28 rotates through the operating position P2, the rollers 98 are adapted to engage the animal and therefore roll against the animal as the animal is urged from the basket area 20 and through the sort gate 32.

Figure 6:
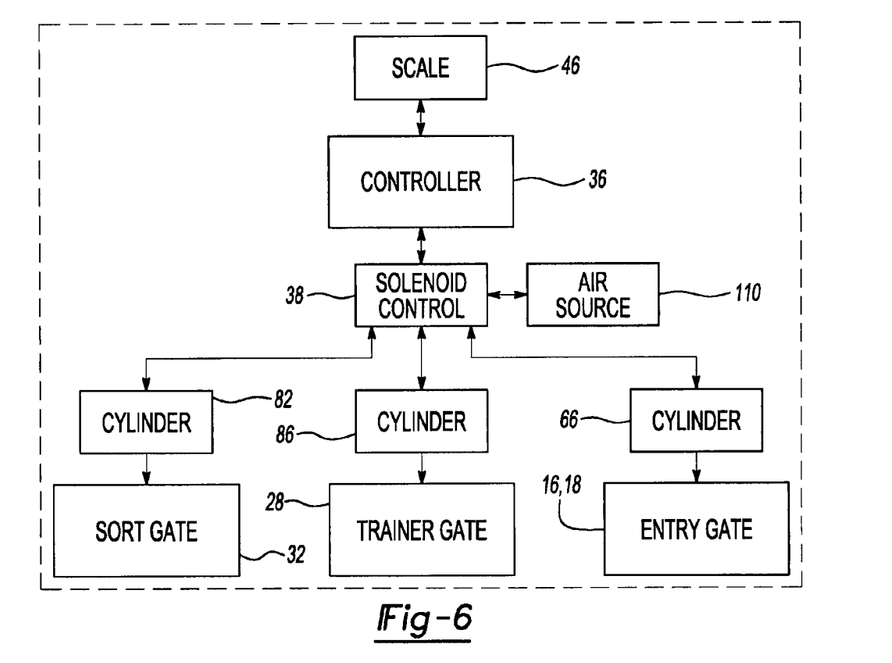
FIG. 6 is an exemplary schematic diagram illustrating the control system of the gate assembly of FIG. 1.
Figure 7:
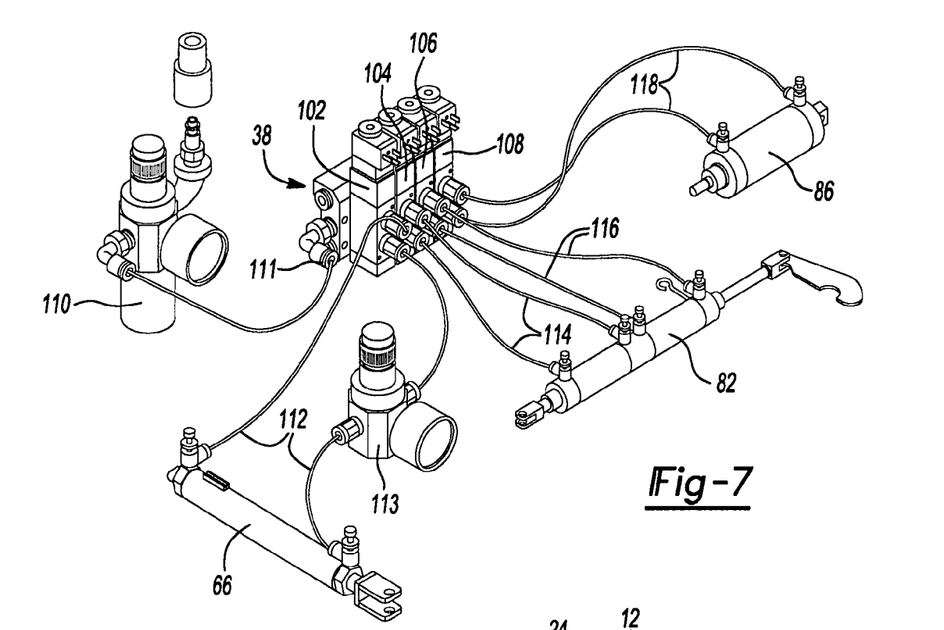
FIG. 7 is a perspective view of an exemplary pneumatic system configured for use in the gate assembly of FIG. 1.

With specific reference now to FIGS. 6 and 7 the operation of the solenoid control unit 38 will be described in greater detail. The solenoid control unit 38 may include four solenoids 102, 104, 106 and 108. An air source 110 can be connected to an inlet 111 of the solenoid control unit 38. A first pair of pneumatic air lines 112 are connected between the first pneumatic cylinder 66 and the first solenoid 102. An accumulator 113 is positioned intermediate the first solenoid 102 and the first pneumatic cylinder 66.

A second and third pair of pneumatic air lines 114 and 116 are connected between the second pneumatic cylinder 82 and the second and third solenoids 104 and 106, respectively. The second pneumatic cylinder 82 is a dual acting cylinder allowing actuation of the sort gate 32 between a closed position (FIG. 1), the first position (solid line, FIG. 13), and the second position (phantom line, FIG. 13). A fourth pair of pneumatic air lines 118 are connected between the third pneumatic cylinder 86 and the fourth solenoid 108. The controller 86 communicates with the solenoid control unit 38 to regulate air delivered to the respective pneumatic cylinders 66, 82 and 86 and actuate one of the entry gates 16, 18, the trainer gate 28 and sort gate 32, respectively. It is appreciated that the pneumatic configuration described herein is merely exemplary and that other configurations may be used.

Figure 15:
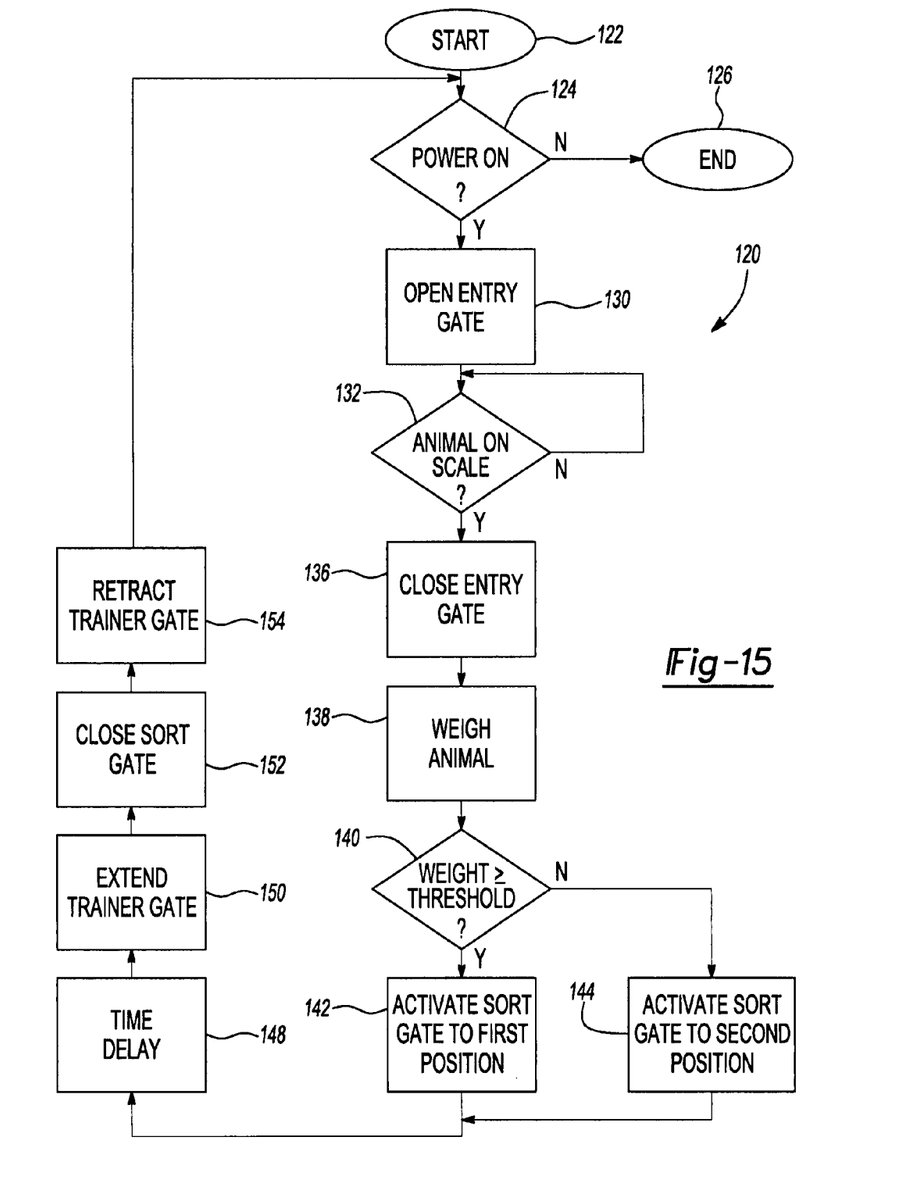
FIG. 15 is an exemplary flow chart illustrating steps for operating the sort gate of FIG. 1.

With reference now to FIG. 15, an exemplary method 120 of operating the gate assembly 10 will be described. Control begins in step 122. In step 124 control determines if power to the gate assembly 10 is on. If not, control ends in step 126. If power is on, control opens the entry gates 16, 18 in step 130. In step 132 control determines if an animal is on the scale 46. In one example, the controller 36 may have a mean weight stored in memory. Once the scale 46 measures a weight within the mean weight, control determines that an animal is present. If control determines there is not an animal on the scale 46, control loops to step 132. If control determines an animal is on the scale 46, the entry gates 16, 18 is closed in step 136.

In step 138 the animal is weighed. In one example, a series of weight measurements, such as 20 are taken in a short timeframe. Once control determines that the series of weight measurements are within a tolerance, such as 4% of each other, an average is taken and the weight is determined. In step 140, control determines if the weight is greater than or equal to a threshold. The threshold may be set according to the specific goals of the application. If the weight threshold is met, the sort gate 32 is actuated to the first position in step 142. If the weight threshold is not met, the sort gate 32 is actuated to the second position in step 144. Once the sort gate 32 has been actuated, a time delay occurs in step 148. Next, the trainer gate 28 is moved through the operating position P2 and to the second static position P3 in step 150. The sort gate 32 is then moved to the closed position in step 152. In step 154, the trainer gate 28 is returned to the first static position P1. Control then loops to step 124.

One advantage of the gate assembly 10 according to the present teachings is that the controller 36 is programmable. In this regard, the gate assembly 10 may be modified as needed for a given application. For example, weight thresholds, time delays, forces needed to actuate the entry gates 16, 18, trainer gate 28 and sort gate 32 may all be easily adjusted through the controller 36. In some instances it may be necessary to increase or decrease the swing force realized by the trainer gate 28 while moving through the operating position P2 based on the weight and/or behavior of the animals being sorted. Furthermore, another advantage of the gate assembly 10 is that the controller 36, solenoid control unit 38 and cylinders 66, 82 and 86 are all self-contained within the confines of the housing 12. As a result, the various components are protected from assorted environmental obstacles. In addition, the entire gate assembly 10 may be easily moved to other locations without disconnecting and reconnecting various electrical wires and pneumatic lines.

Those skilled in the art can now appreciate from the foregoing description that the broad teachings of the present invention can be implemented in a variety of forms. For example, while the discussion above has been specifically directed toward performing a weight measurement on an animal, other or additional measurements may be taken. For example, various physical features may be measured such as, but not limited to, height and length of an animal. Furthermore, it is contemplated that the sex of an animal may be determined by the gate assembly. In another example, the gate assembly may be used to determine if an animal is in heat. Moreover, it is contemplated that the gate assembly may be utilized for other purposes besides sorting. In some examples, the animal may be directed into the gate assembly for observation, branding, identification, or other task.

In this way, other measuring tools may be employed including other sensors such as optical sensors for example. In addition, it is contemplated that each animal may be associated with a particular identification tag such as a radio frequency identification (RFID) tag for example. As a result, a history may be logged for a given animal to chart weight gain and other characteristics. Therefore, while this invention has been described in connection with particular examples thereof, the true scope of the invention should not be so limited since other modifications will become apparent to the skilled practitioner upon a study of the drawings, the specification and the following claims.

What is claimed is:

1. An apparatus for sorting animals comprising:
   a housing including a basket area having a measuring device arranged on a floor of the basket area, the floor extending along a floor plane;
   an entry gate mounted to the housing and moveable between open and closed positions;
   a sort gate mounted to the housing and moveable between a first and a second position based on a measurement taken by the measuring device;
   a trainer gate mounted to the housing through a trainer gate axle that defines a trainer gate axis that extends parallel to the floor plane, the trainer gate being rotatable around the trainer gate axis along an arcuate path between a first static position through an operating position to a second static position whereby the trainer gate moves into contact with an animal in the basket area and urges the animal toward the sort gate through the operating position; and
   a programmable controller communicating with the measuring device, the entry gate, the sort gate and the trainer gate and that controls actuation of the entry gate, the sort gate and the trainer gate.

2. The apparatus of claim 1 wherein the entry gate includes a pair of arms that are moveable between the open and closed positions by a first pneumatic cylinder.

3. The apparatus of claim 1 wherein the measuring device comprises a scale that measures a weight of an animal in the basket area.

4. The apparatus of claim 3 wherein the scale comprises a plurality of protrusions on an upper face thereof.

5. The apparatus of claim 1 wherein the sort gate includes a frame pivotally mounted at first and second pivot joints, wherein the frame is movable about a pivot axis defined through the first and second pivot joints between the first and second positions.

6. The apparatus of claim 5, further comprising a second pneumatic cylinder operably connected to the sort gate to impart rotational motion on the frame about the pivot axis.

7. The apparatus of claim 1 wherein the trainer gate has at least one roller rotatably mounted between lateral ends of the trainer gate, the at least one roller adapted to roll along an animal in the basket area during movement of the trainer gate through the operating position.

8. The apparatus of claim 7 wherein the trainer gate further comprises a third pneumatic cylinder operably coupled to and imparting motion onto a portion of the trainer gate.

9. The apparatus of claim 7 wherein the trainer gate has a trainer gate frame including laterally spaced, longitudinally extending end members, wherein first terminal ends of the end members intersect the trainer gate axis and second terminal ends of the end members support a first roller of the at least one roller.

10. The apparatus of claim 9 wherein both of the laterally spaced end members are closer to containment bars disposed on lateral sides of the basket area than the other laterally spaced end member.

11. An apparatus for sorting animals comprising:
    a housing including a basket area having a measuring device arranged on a floor of the basket area, the floor extending along a floor plane;
    a sort gate mounted to the housing and moveable between a first and a second position based on a measurement taken by the measuring device; and
    a trainer gate mounted to the housing through a trainer gate axle that defines a trainer gate axis that extends parallel to the floor plane, the trainer gate being rotatable around the trainer gate axis along an arcuate path between a first static position through an operating position that defines an arcuate path within the basket area to a second static position whereby the trainer gate moves into contact with an animal in the basket area and urges the animal toward the sort gate through the operating position.

12. The apparatus of claim 11, further comprising an entry gate mounted to the housing and moveable between open and closed positions.

13. The apparatus of claim 12, further comprising a programmable controller communicating with the measuring device, the entry gate, the sort gate and the trainer gate and that controls actuation of the entry gate, the sort gate and the trainer gate.

14. The apparatus of claim 13, further comprising:
a first pneumatic cylinder operably coupled to the entry gate;
a second pneumatic cylinder operably coupled to the sort gate;
a third pneumatic cylinder operably coupled to the trainer gate; and
solenoid control unit that communicates with the programmable controller to regulate fluid delivered to the respective first, second and third pneumatic cylinders.

15. The apparatus of claim 11 wherein the trainer gate has at least one roller rotatably mounted thereon, the at least one roller adapted to roll along an animal in the basket area during movement of the trainer gate through the operating position, wherein the trainer gate has a trainer gate frame including laterally spaced, longitudinally extending end members, wherein first terminal ends of the end members intersect the trainer gate axis and second terminal ends of the end members support a first roller of the at least one roller and wherein both of the laterally spaced end members are closer to containment bars disposed on lateral sides of the basket area than the other laterally spaced end member.

16. A method for sorting aggressive animals comprising:
providing a housing including a basket area having a measuring device arranged on a floor of the basket area, the floor extending along a floor plane, the housing further including an entry gate, a sort gate and a trainer gate;
opening the entry gate;
determining whether an animal is on the measuring device;
closing the entry gate based on the animal being on the measuring device;
measuring the animal;
determining if the animal measures within a threshold;
opening the sort gate in either a first direction or a second direction based on the measurement determination; and
rotating a trainer gate around a trainer gate axis that extends parallel to the floor plane, the trainer gate moving into contact with the animal and urging the animal through the sort gate.

17. The method of claim 16 wherein measuring the animal comprises measuring a weight of an animal in the basket area.

18. The method of claim 16 wherein rotating the trainer gate comprises moving the trainer gate through an operating position along an arcuate path through the basket area.

19. The method of claim 16 wherein extending the trainer gate comprises engaging the animal with at least one roller mounted between lateral ends of the trainer gate, the at least one roller adapted to roll along the animal during movement of the trainer gate through the operating position.

20. The method of claim 16 wherein opening the sort gate includes rotating a frame of the sort gate about a pivot axis defined substantially perpendicular to a floor of the basket area.

* * * * *